Feb. 10, 1959 — A. I. DRANETZ — 2,873,426
CALIBRATING SYSTEM FOR ACCELEROMETERS
Filed March 23, 1954 — 3 Sheets-Sheet 2

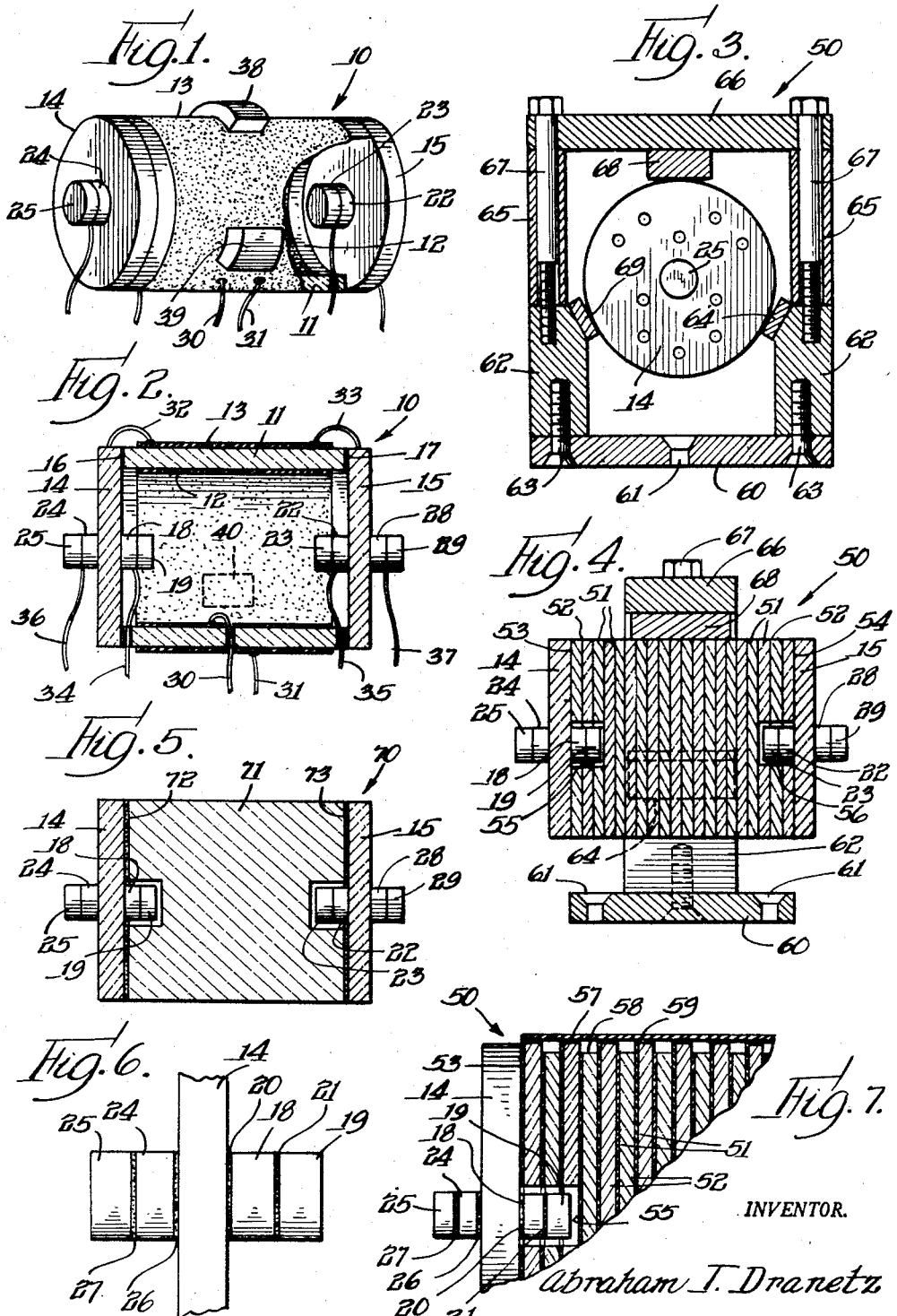

INVENTOR.
Abraham I. Dranetz
BY
Wallenstein & Spangenberg
attys.

Feb. 10, 1959 A. I. DRANETZ 2,873,426
CALIBRATING SYSTEM FOR ACCELEROMETERS
Filed March 23, 1954 3 Sheets-Sheet 3

INVENTOR.
Abraham I. Dranetz
BY
Wallenstein & Spangenberg
attys.

United States Patent Office 2,873,426
Patented Feb. 10, 1959

2,873,426

CALIBRATING SYSTEM FOR ACCELEROMETERS

Abraham I. Dranetz, Metuchen, N. J., assignor to Gulton Industries, Inc., a corporation of New Jersey Application March 23, 1954, Serial No. 418,117

18 Claims. (Cl. 324—56)

This invention is directed to a calibrating system for accelerometers.

In recent years there has existed a need for the measurement of mechanical accelerations containing high frequency components. To meet this need some accelerometers have been designed to have a flat response from 5 C. P. S. to more than 10,000 C. P. S. and such accelerometers are now commercially available. While such accelerometers are available, the techniques for calibrating them over the intended frequency range of operation are inadequate, and, of course, such accelerometers are no more useful than the accuracy of the calibration thereof.

The calibrating equipment for calibrating the accelerometers should consist of a vibrator capable of driving the accelerometer over the intended frequency range and in such manner that the acceleration is known at any frequency. To insure this, the vibrator must be free of internal resonances over the operating range and must also be free of resonances in that range when loaded with the accelerometer under test.

While most electromagnetic vibrators, which have heretofore been constructed for driving accelerometers, are designed to be used up to 1,000 C. P. S., some electromagnetic vibrators are available which are useful up to 2,000 C. P. S., and some experimental work has been done on special designs to be used up to 10,000 C. P. S. The design of such a unit is rather critical in that the moving element must be very small in size and light in weight to obtain high resonant frequency. On the other hand, the housing containing the magnetic field must be massive to absorb the force of reaction, and this housing or support introduces resonances. These electromagnetic devices, for driving and calibrating accelerometers have not been particularly successful, especially at the higher frequencies, and so far as is known they are incapable of use for accurate calibrating purposes with frequencies up to 10,000 C. P. S. or anywhere near thereto.

Several approaches may be used to solve this problem of calibration at these higher frequencies. One approach is to mechanically shock an accelerometer, record its transient electrical output to determine its natural resonant frequency and damping coefficient, and then by assuming this primary resonance to be its only resonance, calculate the theoretical response. This will yield only a very rough response and will not provide an accurate calibration. Another approach is to measure the electrical impedance of the sensitive element when mounted in the accelerometer, thereby again determining resonant frequency and damping coefficient. However, this does not take into account housing resonance.

Still another approach is to place the accelerometer on a standard type of vibrator, with all its resonances, and determine actual accelerations by means of sinusoidal displacement measurements made with an interferometer. Since with a constant magnitude of sinusoidal acceleration the displacement varies inversely as the square of the frequency, at the higher frequencies the displacement is too small to be measured and this type of system is limited to frequencies of approximately 5,000 C. P. S.

The principal object of this invention is to provide a new and improved approach to the problem of calibrating accelerometers at high frequencies in order to produce accurate calibrations thereof. More specifically, an object of this invention is to provide a new and improved system of high frequency calibration for accelerometers, utilizing a piezoelectric or magnetostrictive vibrator of new construction for vibrating the accelerometer under test and employing a simple method for creating and measuring accelerations.

The system is constructed and arranged to resonate far above the operating range and, briefly, it consists of three parts, a novel inertia type piezoelectric or magnetostrictive vibrator for vibrating the accelerometers under test, special high frequency accelerometers mounted within the vibrator, and electrical and electromechanical equipment arranged primarily to speed and simplify calibrations. This system is capable of driving the accelerometers under test over the intended frequency range of at least 5 C. P. S. to 10,000 C. P. S. or more and in such manner that the acceleration is known at any frequency. The system is free of internal resonances over the operating range and is also free of resonances in that range when loaded with the accelerometers under test.

Further objects of this invention reside in the details of construction of the calibrating system and the parts thereof and in the cooperative relationship between the component parts of the system.

Other objects and advantages of this invention will become apparent to those skilled in the art upon reference to the accompanying specification, claims and drawings in which—

Fig. 1 is a perspective view, partly broken away, illustrating one form of the vibrator of this invention;

Fig. 2 is a vertical sectional view through the vibrator illustrated in Fig. 1;

Fig. 3 is a vertical sectional view through the mounting means for the vibrator, but illustrating the vibrator in end elevation;

Fig. 4 is a vertical sectional view through the vibrator and mounting means as illustrated in Fig. 3 and showing another form of the vibrator;

Fig. 5 is a vertical sectional view through still another form of the vibrator;

Fig. 6 is a partial elevational view of one of the end plates showing a standard accelerometer and an accelerometer under test mounted thereon;

Fig. 7 is a partial sectional view of the form of the vibrator illustrated in Fig. 4.

Figure 8:
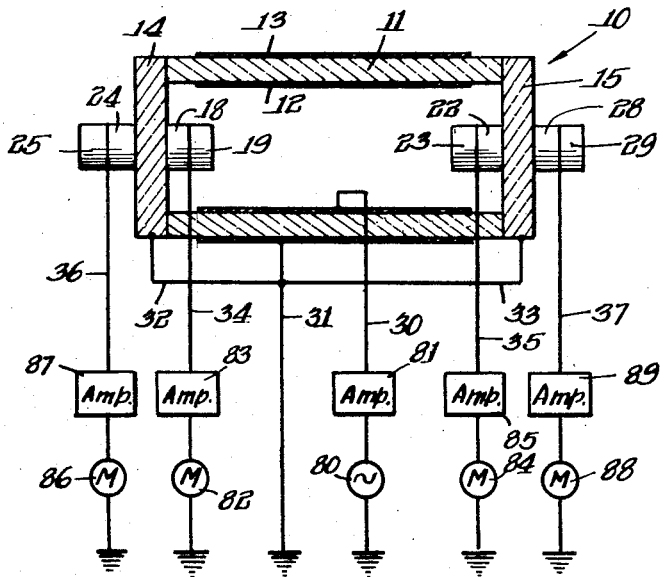
Fig. 8 is an illustration showing the manner of electrically connecting the vibrator and the standard and test accelerometers to amplifiers, meters and a source of high frequency alternating voltage for the purpose of calibrating the accelerometers under test.

Referring first to Figs. 1, 2 and 6. One form of the vibrator is generally designated at 10. It includes a piezoelectric tube 11 which for example may be formed of a barium titanate ceramic or the like material. It is provided on its inner side with a silver electrode 12 and on its outer side with a silver electrode 13. These electrodes extend to within approximately ⅛″ from the ends of the tube. The electrodes may be formed on the tube in any suitable manner as by applying a silver paste thereto and then fusing the same in place on the tube.

A pair of end plates 14 and 15 are secured to the ends of the tube 11. These end plates are cemented or bonded to the tubes in any suitable manner as indicated at 16 and 17. The end plates may be of any suitable material either glass or metal, and the lighter the weight of the end plates the better. In the case of metal, the end plates may be made from aluminum, magnesium or titanium, the latter being preferred. Where temperatures in excess of 100° centigrade are utilized for cementing or bonding the end plates to the tubes, the barium titanate ceramic tube 11 should be polarized thereafter. To polarize the tube 11 a D. C. voltage is applied to the electrodes 12 and 13 for a sufficiently long period of time to permanently polarize the tube. The ceramic tube 11 and the end plates 14 and 15 are of such dimensions that the radial resonances of the tube, the bending resonances of the end plates and the mass loaded longitudinal resonances (including the mass of the accelerometers) are all approximately three times as high as the highest frequencies of the testing range.

A simple uncased test accelerometer is mounted on the inner side of the end plate 14. It includes a piezoelectric disc, such as a barium titanate ceramic disc 18, which is approximately ⅛″ thick by ¼″ diameter, and also a mass 19 of the same size. The ceramic disc 18 is plated with conducting electrodes 20 and 21 on each side and is cemented with an electrically conducting cement as indicated at 20 to the end plate 14 and as indicated at 21 to the mass 19.

In a like manner a simple uncased test accelerometer consisting of a piezoelectric disc 22 and a mass 23 is secured to the inner side of the other end plate 15. These test accelerometers have been previously polarized in the normal manner and have been previously calibrated. These test accelerometers yield an open circuit output of approximately five millivolts per g. of acceleration, and they have a fundamental resonant frequency of approximately 300,000 C. P. S. Since these accelerometers are uncased, they have no case resonances and they have a flat response up to approximately 100,000 C. P. S., well above the intended range of operation. The standard accelerometers may be calibrated in any usual manner. For example, two of these light weight standard accelerometers of identical size, shape and weight may be calibrated on another system at a frequency slightly above the lowest frequency to be used, such at 1,000 C. P. S.

Substantially any type of light weight accelerometer may be tested and calibrated by the vibrator of this invention and for purposes of illustration here, they are shown to be simple uncased accelerometers. Here, a test accelerometer includes a piezoelectric disc, such as a titanate ceramic disc 24 and a mass 25, the piezoelectric disc 24 being plated with electrodes and being bonded as indicated at 26 and 27 to the end plate 14 and to the mass 25. A like test accelerometer consisting of a piezoelectric disc 28 and a mass 29 is secured in a similar manner to the other end plate 15. The end plates 14 and 15 are preferably provided with a plurality of different sized screw threaded holes by which cased accelerometers to be tested may be mounted on the end plates.

The inner electrode 12 and the outer electrode 13 of the vibrator are provided with leads 30 and 31 for applying high frequency alternating voltage to the vibrator for vibrating the same at the desired frequency. The lead 31 forms the ground lead. The outer electrode 13 is connected by conductors 32 and 33 to the end plates 14 and 15 so that these end plates are also grounded. One of the electrodes of each of the piezoelectric discs 18, 22, 24 and 28 of the accelerometers are connected to the ground through the grounded plates 14 and 15. The other electrodes of the piezoelectric discs 18, 22, 24 and 28 of the accelerometers are provided with leads 34, 35, 36 and 37, respectively, which extend through suitable amplifiers and meters for measuring the output of the accelerometers as they are vibrated by the vibrator.

The vibrator 10 is mounted by acoustically soft pads so that the vibrator is vibrated only against inertia. Preferably, the vibrator 10 is mounted at its center by means of three acoustically soft pads 38, 39 and 40, these pads being spaced equally around the circumference of the vibrator at its longitudinal center. In this manner the ends of the tube and hence the end plates move apart while the center stays fixed, and due further to the soft clamping or mounting, no acoustic energy is fed to the holding fixture, and hence no resonance of the holding fixture can be excited. As a result, only the resonances of the vibrator, with its mass loading by the accelerometers, need be controlled.

The standard and the test accelerometers are arranged on the end plates of the vibrator and the vibrator is a true reaction type of vibrator operating only against inertia. Preferably, the vibrator including the standard and test accelerometers is symmetrical about its center. Since the standard accelerometers had previously been tested and calibrated at the lower frequencies and since the characteristics of the standard accelerometers are known and their response is flat, the input voltage to the vibrator may be adjusted as to frequency and voltage to obtain outputs of these standard accelerometers corresponding to known values of vibration. The outputs of the standard accelerometers are then recorded. Since the standard accelerometers have a flat frequency response up to 100 kc., the electromechanical sensitivity factor can then be used to determine the magnitude of vibration at any frequency below this value.

Another form of vibrator is generally designated at 50 in Figs. 3, 4 and 7. Instead of using a piezoelectric tube this form of the invention utilizes a plurality of piezoelectric wafers 51 arranged in a stack. These wafers may be formed from a barium titanate ceramic and they are silver plated and cemented together as indicated at 52. One end of the stack is silver plated and cemented to the end plate 14 as indicated at 53 and the other end is silver plated and cemented to the end plate 15 as indicated at 54. The end discs of the stack may be hollowed as indicated at 55 and 56 for receiving the standard accelerometers. The silver electrode on one face of each wafer is extended over the edge of the wafer as indicated at 57. The edge of the wafers diametrically opposite from the electrode extensions 57 are recessed as indicated at 58. The wafers are so arranged that adjacent wafers are angularly displaced 180° from each other. In this way, the electrode extensions 57 of alternate wafers are arranged in alignment and they may be electrically connected together by a metallic ribbon 59 suitably soldered thereto. In this way, the wafers are electrically connected in parallel so that a given polarity of driving voltage expands all of the wafers in the thickness mode, while the reverse polarity contracts all of the discs in the thickness mode. Thus when the stack of wafers, which has previously been permanently polarized by the application of a D. C. potential thereto, is subjected to a high frequency alternating voltage the vibrator is caused to vibrate in its longitudinal direction in accordance with the applied voltage.

The vibrator arrangement of Figs. 3, 4 and 7 utilizing the stack of piezoelectric wafers has several advantages over the tube form illustrated in Figs. 1 and 2. Maximum displacement is in the longitudinal direction and hence more displacement is brought about. The radial resonance frequency with a given diameter is higher than with the tube of the same diameter. The effect of mass on the end plates in lowering longitudinal resonance frequency is greater in the case of the tube than in the case of the stacked wafers. Thus, the resonance will be lower for the tube of the same size.

The mounting fixture for mounting the vibrator at its center is simple in construction. It includes a base 60 which may be secured by screws 61 to a suitable support. It also includes a pair of upright members 62 held in place on the base 60 by screws 63. These upright members 62 carry a pair of acoustically soft pads 64 which are contacted by the center of the vibrator. The uprights 62 are provided with extensions 65 upon which is secured a bridge member 66 by means of screws 67. The bridge member 66 carries an acoustically soft pad 68 which also engages the center of the vibrator. In this way the vibrator is mounted at its longitudinal center so that it acts only against inertia and is not affected by resonances of the mounting fixture.

Fig. 5 illustrates a further form of the vibrator, it being generally designated at 70. It includes a solid rod 71 of piezoelectric material such as barium titanate ceramic which is provided at its ends with electrodes 72 and 73. The piezoelectric rod 71 is permanently polarized longitudinally by the application of a D. C. voltage across the electrodes 72 and 73. The end plates 14 and 15 are suitably secured to the electrodes 72 and 73. When a high frequency alternating voltage is applied to the vibrator 70 it vibrates longitudinally and since it is supported in the manner of the other vibrators it vibrates only against inertia. This form of the vibrator is preferable to the form illustrated in Figs. 3, 4 and 7, for use with frequencies above 15,000 cycles per second, wherein cemented joints are critical. The form of vibrator using the stack of wafers is preferable at the lower frequencies, where with a given applied voltage, greater displacement is desired.

As to the theory of operation of this invention, wherein the vibrator, piezoelectric crystal or titanate ceramic element, is driven electrically and centrally supported so as to move against inertia, its operation is represented by the following practical equivalent circuit utilizing an ideal electromechanical transformer:

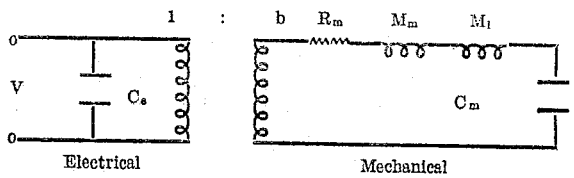

where V is the voltage input, $C_e$ is the electrical capacitance
$R_m$ is the internal mechanical loss
$M_m$ is the effective lumped mechanical inertia of the vibrator
$M_l$ is the effective mass of the load
$C_m$ is the effective lumped mechanical compliance of one end of the vibrator
$b$ is a constant of the material, size, shape and system of polarization, which determines how much of the electrical charge absorbed by the unit is converted into mechanical displacement.

Speaking in terms of electrical circuits, the input voltage produces an electrical charge on $C_e$ and also on $C_m$. This charge on $C_m$ is, in effect, the mechanical displacement of one end of the vibrator with voltage applied.

Since mechanical displacement is the analogue of electrical charge across $C_m$, with a sinusoidal input voltage $$v = V \sin \omega t$$

the mechanical displacement per volt of the end of the vibrator of this invention is:

$$d = D(f) \sin (\omega t + \phi)$$

where V is a constant, $D(f)$ is a function of frequency, and $\phi$ is some phase angle between the actual displacement and the driving voltage.

Figure 11:
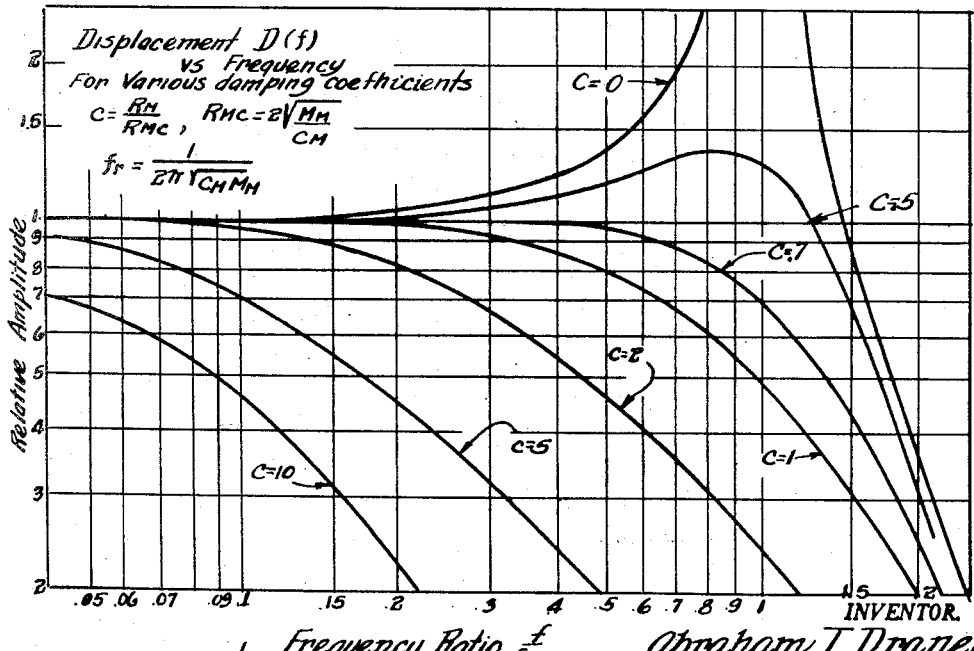
Fig. 11 is a graph illustrating characteristic curves, plotting displacement vs. frequency.

In Fig. 11 there is plotted the function $D(f)$ vs. frequency for several values of mechanical damping. Several points should be noted—$f_r$, the mechanical resonant frequency, is satisfied by the equation:

$$f_r = \frac{1}{2\pi\sqrt{C_m(M_m + M_l)}}$$

C, the damping coefficient, is satisfied by the equation:

$$C = \frac{R_m}{R_{mc}}$$

where $R_{mc}$ is the critical damping resistance. The system of this invention uses a low damping coefficient (small $R_m$) and hence the curve applicable to this system is almost $C=0$. The $C=0$ curve is flat to within 20% of the operating frequency and is kept below 30% of the resonant frequency.

In this manner the vibrator of this invention is a displacement producing device, with the displacement per volt given by the equation:

$$d = D(f) \sin (\omega t + \phi) \text{ length units per volt input}$$

Since the instantaneous acceleration of a moving object is given by $$a = \frac{d^2 d}{dt^2}$$

the instantaneous acceleration becomes $$a = D(f)\omega^2 \sin (\omega t + \phi)$$

or $$a = D(f)\omega^2 \sin (\omega t + \beta)$$

units of acceleration per volt input. Therefore, the R. M. S. acceleration per unit R. M. S. volt input is:

$$\frac{A \text{ R. M. S.}}{V \text{ R. M. S.}} = D(f)\omega^2$$

Accordingly, the acceleration in the region well below resonance is parabolic. As the frequency is increased the resonant effect will tend to increase the value of acceleration, limiting the practical range of operation.

Figure 12:
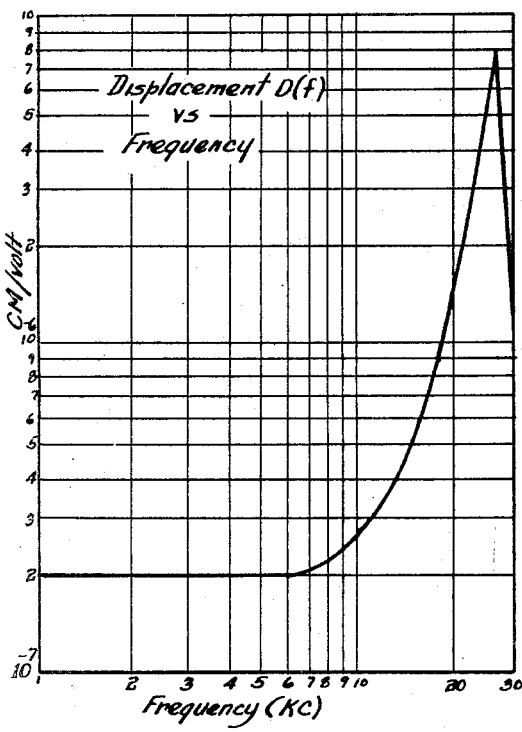
Fig. 12 is a graph plotting displacement vs. frequency of one of the forms of the vibrator of this invention.

Fig. 12 is a log-log graph and shows the measured displacement for an applied voltage of 1 volt of each end of the vibrator illustrated in Figs. 3, 4 and 7 wherein each end of the vibrator was loaded with a mass of 2 grams. The frequency is in kilocycles per second, the displacement is in centimeters (R. M. S.), and the applied voltage is (R. M. S.). Since the vibrator can be operated at more than 100 volts (R. M. S.) input, it is possible to obtain displacements of more than .0002 cm. (R. M. S.) with this particular arrangement.

Figure 13:
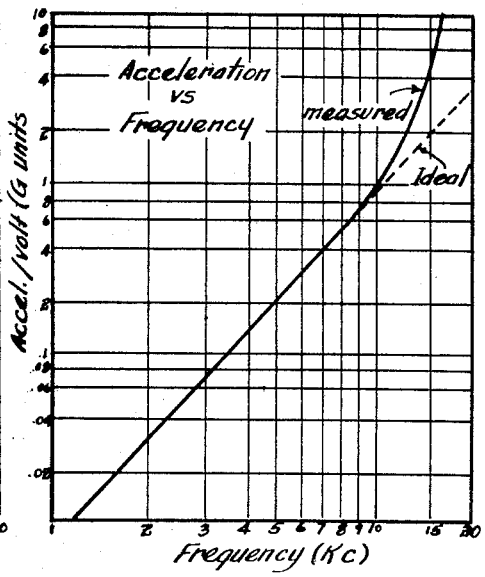
Fig. 13 is a graph plotting acceleration vs. frequency for one of the forms of the vibrator of this invention.

Fig. 13 indicates the results of acceleration measurements. Plotted on a log-log graph, the curve is practically a straight line, indicating that $$\log a \text{ (R. M. S.)} = 2 \log \omega + \log B$$

or $$A \text{ (R. M. S.)} = B\omega^2$$

where B is a constant. Above 9 kc., the experimental curve has an upward turn, due to the effect of approaching the resonant frequency. The useful frequency of operation of this particular vibrator has the following limits. The useful high frequency is limited by the upward turn of the curve at the right side. With end loading less than one ounce this frequency is approximately 9.5 kc. The lowest useful frequency is determined by the sensitivity of the accelerometers in combination with the possible acceleration attainable. With accelerometers having a sensitivity of 5 mv./g. and with 100 volts (R. M. S.) applied to the vibrator, this particular vibrator may be used to as low as 35 C. P. S. Thus, the possible operating range of this particular vibrator is from 35 C. P. S. to 9500 C. P. S. Normally, however, this particular unit is used from 500 C. P. S. to 9500 C. P. S., since other types of vibrators are commercially available for use up to 1000 C. P. S.

The vibrators of this invention may be used in various ways for calibrating accelerometers. Fig. 8 of the drawing shows, by way of illustration, the vibrator 10 of Figs. 1 and 2 operatively connected with appropriate electronic and measuring equipment for accelerometer calibrating purposes. Here, one side of an alternating current voltage source 80 is connected to ground and the other side is connected through a suitable voltage and power amplifier 81 and conductor 30 to the electrode 12 of the vibrator. The other electrode 13 and the end plates 14 and 15 of the vibrator are connected to ground through conductors 31, 32 and 33. The alternating current voltage source 80 is adjustable independently to regulate the frequency over the desired frequency range and to regulate the voltage output within a desired range. By suitably adjusting the alternating voltage source 81 the frequency of vibration of the vibrator 10 and the amplitude of vibration (the displacement) thereof, and hence the acceleration, may be regulated at will.

The ungrounded sides of the standard accelerometers 18 and 22 are connected respectively through conductor 34, voltage and power amplifier 83 and voltmeter 82 to ground and through conductor 35, voltage and power amplifier 85 and voltmeter 84 to ground. Likewise, the ungrounded sides of the accelerometers on test 24 and 28 are connected respectively through conductor 36, voltage and power amplifier 87 and voltmeter 86 to ground and through conductor 37, voltage and power amplifier 89 and voltmeter 88 to ground. As the standard accelerometers and the accelerometers under test are vibrated by the vibrator, they develop voltages corresponding to their vibrations and these voltages so developed and amplified are measured by the meters.

In using the arrangement of this invention for calibrating accelerometers, a calibration curve similar to Fig. 13 may be constructed for the vibrator. This may be accomplished by applying a series of known voltages and known frequencies to the vibrator, recording the output of the standard accelerometers for each, and constructing the calibration curve from this data. In calibrating the accelerometers under test, known voltages and frequencies are applied to the vibrator, the outputs of the accelerometers under test are measured and then they are compared with the calibration curve to determine the acceleration characteristics of the accelerometers under test.

Another manner of calibration is to set the input voltage, at any particular frequency, to the vibrator to obtain a given predetermined output measurement on the meters for the standard accelerometers, measure the outputs from the accelerometers under test, and then compare the measurements for obtaining the acceleration characteristics of the accelerometers under test.

In both of the above calibration methods, some inconvenience occurs due to the wide range of driving voltage to be used in driving the vibrator. To obviate this inconvenience several other systems can be used. For example, a double integrating pre-amplifier may be used between the accelerometers and the measuring meters. Such a preamplifier has a frequency input-output characteristic which is the inverse of that of the vibrator (shown in Fig. 13). Hence, the voltage into the meters will be independent of frequency if the voltage into the vibrator is not changed in magnitude as the frequency is changed. In this way, direct readings of acceleration can be obtained. Alternatively, a double integrating amplifier may be used to drive the vibrator to obtain the same result. This latter method has been found more suitable since the signals are of greater level and hence less difficulties are encountered with signal-to-noise problems.

Figure 9:
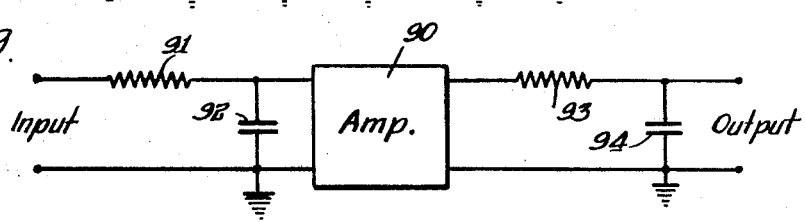
Figs. 9 and 10 illustrate different forms of double integrating networks that may be utilized in the arrangement of Fig. 8.
Figure 10:
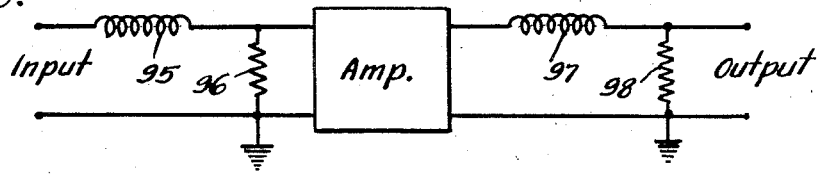

Figs. 9 and 10 illustrate, by way of example, two simplified forms of double integrating amplifiers that may be used for obtaining direct readings of acceleration. In Fig. 9, an amplifier 90, having a stage of voltage and a stage of power amplification, is provided with an input circuit and an output circuit. The input circuit includes a series resistance 91 and shunt capacitance 92 and the output circuit also includes a series resistance 93 and a shunt capacitance 94. The integrating network of each input and output circuit consists essentially of a voltage divided two element network. The current, regulated by the high impedance resistances 91 and 93, charges up the capacitive impedances 92 and 94 in such a manner that the voltage outputs therefrom are proportional to the time integral of the current. Hence, the output voltages from the input and output circuits are the time integrals of the input voltages applied thereto.

In Fig. 10 the integrating networks of the input and output circuits for the amplifier 90 include series inductances 95 and 97 and shunt resistances 96 and 98, and consist essentially of voltage divided two element networks. Here the inductances control the current in such a manner that the current is the time integral of the voltages across the inductances. The resistances 96 and 98, which have much less impedance than the inductances, produce a voltage proportional to the current and hence their output voltages are proportional to the time integral of the input voltages applied to the networks.

Figure 14:
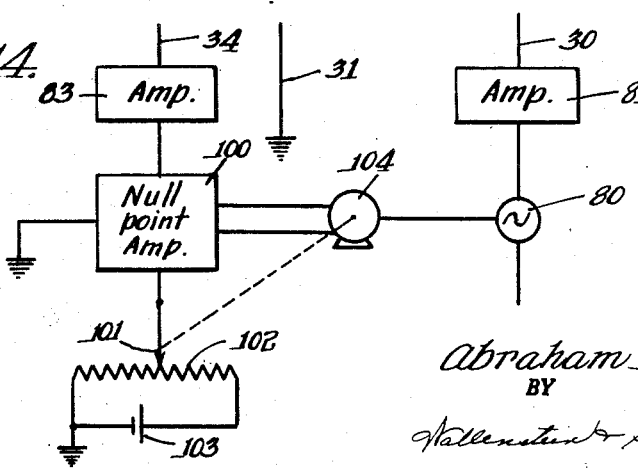
Fig. 14 is a wiring diagram illustrating the manner of automatically adjusting the voltage output of the high frequency alternating voltage source which may be utilized in the arrangement of Fig. 8.

Fig. 14 illustrates an arrangement for automatically maintaining the output voltages of the standard accelerometers constant for various frequencies of operation by automatically adjusting the input voltage to the vibrator. Here the output from the amplifier 83 connected to the test accelerometer 18 is fed to a null point amplifier 100. A potentiometer 101, 102 and voltage source 103 is connected to the null point amplifier 100 in opposition to the output of the amplifier 83. The null point amplifier controls a reversible motor 104 which adjusts the voltage of the voltage source 80 and also the potentiometers 101, 102. This arrangement automatically adjusts the voltage of the voltage source to the vibrator to maintain constant the voltage output of the standard accelerometer regardless of the frequency of the voltage of the voltage source. Thus, in utilizing the vibrator for calibrating the accelerometers on test, all that is necessary is to regulate the frequency of the voltage source and take the readings of the accelerometers under test from the meters 86 and 88. This greatly simplifies the test procedure.

While for purposes of illustration several forms of this invention have been disclosed, other forms thereof may become apparent to those skilled in the art upon reference to this disclosure and therefore this invention is to be limited only by the scope of the appended claims.

I claim as my invention:

1. A vibrator for calibrating accelerometers over a high frequency testing range comprising, an elongated vibrator member constructed for vibration in its longitudinal direction and having a resonant frequency far in excess of the highest frequency of the testing range, means electrically connected to the vibrator member and including an alternating voltage source for vibrating the vibrator member at a frequency within the high frequency testing range, means including acoustically soft pads mounting the vibrator member so that the vibrator member is vibrated only against inertia, and means on the ends of the vibrator member for mounting accelerometers under test.

2. A vibrator for calibrating accelerometers over a high frequency testing range comprising, an elongated vibrator member constructed for vibration in its longitudinal direction, means electrically connected to the vibrator member and including an alternating voltage source for vibrating the vibrator member at a frequency within the high frequency testing range, means on the ends of the vibrator member for mounting accelerometers under test, the resonant frequency of the assembly including the vibrator member and the test accelerometers being far in excess of the highest frequency of the testing range, and means including acoustically soft pads mounting the vibrator member so that the vibrator member and the test accelerometers are vibrated only against inertia.

3. A vibrator for calibrating accelerometers over a high frequency testing range comprising, an elongated vibrator member constructed for vibration in its longitudinal direction, means electrically connected to the vibrator member and including an alternating voltage source for vibrating the vibrator member at a frequency within the high frequency testing range, a standard accelerometer mounted on each end of the vibrator member, each standard accelerometer having a resonant frequency far in excess of the highest frequency of the testing range, means on each end of the vibrator member for mounting an accelerometer under test, the resonant frequency of the assembly including the vibrator member and standard and test accelerometers being far in excess of the highest frequency of the testing range, and means including acoustically soft pads mounting the vibrator member so that the vibrator member and the standard and test accelerometers are vibrated only against inertia.

4. In a calibrating system for calibrating accelerometers over a high frequency testing range, an elongated vibrator member constructed for vibration in its longitudinal direction, means electrically connected to the vibrator member and including an alternating voltage source which is adjustable as to frequency and voltage for vibrating the vibrator member within the high frequency testing range, the resonant frequency of the vibrator member being far in excess of the highest frequency of the testing range, means including acoustically soft pads mounting the vibrator member so that the vibrator member is vibrated only against inertia, means on the ends of the vibrator member for mounting accelerometers under test, and means electrically connected to the accelerometers under test for measuring the electrical output thereof.

5. In a calibrating system for calibrating accelerometers over a high frequency testing range, an elongated vibrator member constructed for vibration in its longitudinal direction, means electrically connected to the vibrator member and including an alternating voltage source which is adjustable as to frequency and voltage for vibrating the vibrator member at frequencies within the high frequency testing range, a standard accelerometer mounted on each end of the vibrator member, each standard accelerometer having a resonant frequency far in excess of the highest frequency of the testing range, means on each end of the vibrator member for mounting an accelerometer under test, the resonant frequency of the assembly including the vibrator member and standard and test accelerometers being far in excess of the highest frequency of the testing range, means including acoustically soft pads mounting the vibrator member so that the vibrator member is vibrated only against inertia, means electrically connected to the standard accelerometers for measuring the electrical output thereof, and means electrically connected to the accelerometers under test for measuring the electrical output thereof.

6. In a calibrating system for calibrating accelerometers over a high frequency testing range, an elongated vibrator member constructed for vibration in its longitudinal direction, means electrically connected to the vibrator member and including an alternating voltage source which is adjustable as to frequency and voltage and a double integrating amplifier for vibrating the vibrator member at frequencies within the high frequency testing range, the resonant frequency of the vibrator member being far in excess of the highest frequency of the testing range, means including acoustically soft pads mounting the vibrator member so that the vibrator member is vibrated only against inertia, means on the ends of the vibrator member for mounting accelerometers under test, and means electrically connected to the accelerometers under test for measuring the electrical output thereof.

7. In a calibrating system for calibrating accelerometers over a high frequency testing range, an elongated vibrator member constructed for vibration in its longitudinal direction, means electrically connected to the vibrator member and including an alternating voltage source which is adjustable as to frequency and voltage and a double integrating amplifier for vibrating the vibrator member at frequencies within the high frequency testing range, a standard accelerometer mounted on each end of the vibrator member, each standard accelerometer having a resonant frequency far in excess of the highest frequency of the testing range, means on each end of the vibrator member for mounting an accelerometer under test, the resonant frequency of the assembly including the vibrator member and standard and test accelerometers being far in excess of the highest frequency of the testing range, means including acoustically soft pads mounting the vibrator member so that the vibrator is vibrated only against inertia, means electrically connected to the standard accelerometers for measuring the electrical output thereof, and means electrically connected to the accelerometers under test for measuring the electrical output thereof.

8. In a calibrating system for calibrating accelerometers over a high frequency testing range, an elongated vibrator member constructed for vibration in its longitudinal direction, means electrically connected to the vibrator member and including an alternating voltage source which is adjustable as to frequency and voltage for vibrating the vibrator member at frequencies within the high frequency testing range, the resonant frequency of the vibrator member being far in excess of the highest frequency of the testing range, means including acoustically soft pads mounting the vibrator member so that the vibrator member is vibrated only against inertia, means on the ends of the vibrator member for mounting accelerometers under test, and means electrically connected to the accelerometers under test and including a double integrating amplifier for measuring the electrical output thereof.

9. In a calibrating system for calibrating accelerometers over a high frequency testing range, an elongated vibrator member constructed for vibration in its longitudinal direction, means electrically connected to the vibrator member and including an alternating voltage source which is adjustable as to frequency and voltage for vibrating the vibrator member at frequencies within the high frequency testing range, a standard accelerometer mounted on each end of the vibrator member, each standard accelerometer having a resonant frequency far in excess of the highest frequency of the testing range, means on each end of the vibrator member for mounting an accelerometer under test, the resonant frequency of the assembly including the vibrator member and standard and test accelerometers being far in excess of the highest frequency of the testing range, means including acoustically soft pads mounting the vibrator member so that the vibrator member is vibrated only against inertia, means electrically connected to the standard accelerometers and including a double integrating amplifier for measuring the electrical output thereof, and means electrically connected to the accelerometers under test and including a double integrating amplifier for measuring the electrical output thereof.

10. In a calibrating system for calibrating accelerometers over a high frequency testing range, an elongated vibrator member constructed for vibration in its longitudinal direction, means electrically connected to the vibrator member and including an alternating voltage source which is adjustable as to frequency and voltage for vibrating the vibrator member at frequencies within the high frequency testing range, a standard accelerometer mounted on each end of the vibrator member, each standard accelerometer having a resonant frequency far in excess of the highest frequency of the testing range, means on each end of the vibrator member for mounting an accelerometer under test, the resonant frequency of the assembly including the vibrator member and standard and test accelerometers being far in excess of the highest frequency of the testing range, means including acoustically soft pads mounting the vibrator member so that the vibrator member is vibrated only against inertia, motor means for adjusting the voltage of the voltage source, a potentiometer adjusted by the motor means, null point control means electrically connected to one of the standard accelerometers and the potentiometer and to the motor means for automatically adjusting the voltage of the voltage source to maintain the voltage output of the standard accelerometer substantially constant, and means electrically connected to the accelerometers under test for measuring the electrical output thereof.

11. A vibrator for calibrating accelerometers over a high frequency testing range comprising an elongated vibrator member formed of piezoelectric material so as to vibrate in its longitudinal direction in accordance with a high frequency alternating voltage applied thereto and having a resonant frequency far in excess of the highest frequency of the testing range, means electrically connected to the vibrator member and including an alternating voltage source for vibrating the vibrator member at a frequency within the high frequency testing range, means including acoustically soft pads mounting the vibrating member so that the vibrator member is vibrated only against inertia, and means on the ends of the vibrator member for mounting accelerometers under test.

12. A vibrator for calibrating accelerometers over a high frequency testing range comprising an elongated vibrator member including a tube of piezoelectric material provided with inner and outer electrodes and end plates secured thereto and vibratable in a longitudinal direction in accordance with a high frequency alternating voltage applied thereto and having a resonant frequency far in excess of the highest frequency of the testing range, means electrically connected to the vibrator member and including an alternating voltage source for vibrating the vibrator member at a frequency within the high frequency testing range, means including acoustically soft pads mounting the vibrating member so that the vibrator member is vibrated only against inertia, and means on the end plates of the vibrator member for mounting accelerometers under test.

13. A vibrator for calibrating accelerometers over a high frequency testing range comprising an elongated vibrator member including a rod of piezoelectric material provided with electrodes at its ends and end plates secured thereto and vibratable in a longitudinal direction in accordance with a high frequency alternating voltage applied thereto and having a resonant frequency far in excess of the highest frequency of the testing range, means electrically connected to the vibrator member and including an alternating voltage source for vibrating the vibrator member at a frequency within the high frequency testing range, means including acoustically soft pads mounting the vibrating member so that the vibrator member is vibrated only against inertia, and means on the end plates of the vibrator member for mounting accelerometers under test.

14. A vibrator for calibrating accelerometers over a high frequency testing range comprising an elongated vibrator member including a stack of piezoelectric wafers secured together by electrodes therebetween and end plates secured thereto, alternate ones of said electrodes being electrically connected together so as to cause the vibrator member to vibrate in a longitudinal direction in accordance with a high frequency voltage applied to the electrodes, said vibrator member having a resonant frequency far in excess of the highest frequency of the testing range, means electrically connected to the vibrator member and including an alternating voltage source for vibrating the vibrator member at a frequency within the high frequency testing range, means including acoustically soft pads mounting the vibrating member so that the vibrator member is vibrated only against inertia, and means on the end plates of the vibrator member for mounting accelerometers under test.

15. A vibrator for calibrating accelerometers over a high frequency testing range comprising an elongated vibrator member formed of piezoelectric material so as to vibrate in its longitudinal direction in accordance with high frequency alternating voltage applied thereto, having end plates and having a resonant frequency far in excess of the highest frequency of the testing range, means electrically connected to the vibrator member and including an alternating voltage source for vibrating the vibrator member at a frequency within the high frequency testing range, means including acoustically soft pads mounting the vibrator member so that the vibrator member is vibrated on each end plate of the vibrator member, and means on the end plates of the vibrator member for mounting accelerometers under test.

16. A vibrator for calibrating accelerometers over a high frequency testing range comprising an elongated vibrator member including a tube of piezoelectric material provided with inner and outer electrodes so as to vibrate in its longitudinal direction in accordance with high frequency alternating voltage applied thereto, having end plates and having a resonant frequency far in excess of the highest frequency of the testing range, means electrically connected to the vibrator member and including an alternating voltage source for vibrating the vibrator member at a frequency within the high frequency testing range, means including acoustically soft pads mounting the vibrator member so that the vibrator member is vibrated only against inertia, a standard accelerometer mounted on each end plate of the vibrator member, and means on the end plates of the vibrator member for mounting accelerometers under test.

17. A vibrator for calibrating accelerometers over a high frequency testing range comprising an elongated vibrator member including a rod of piezoelectric material provided with electrodes at its ends so as to vibrate in its longitudinal direction in accordance with high frequency alternating voltage applied thereto, having end plates and having a resonant frequency far in excess of the highest frequency of the testing range, means electrically connected to the vibrator member and including an alternating voltage source for vibrating the vibrator member at a frequency within the high frequency testing range, means including acoustically soft pads mounting the vibrator member so that the vibrator member is vibrated only against inertia, a standard accelerometer mounted on each end plate of the vibrator member, and means on the end plates of the vibrator member for mounting accelerometers under test.

18. A vibrator for calibrating accelerometers over a high frequency testing range comprising an elongated vibrator member including a stack of piezoelectric wafers secured together by electrodes therebetween, alternate ones of said electrodes being electrically connected together so as to vibrate in its longitudinal direction in accordance with high frequency alternating voltage applied thereto, having end plates and having a resonant frequency far in excess of the highest frequency of the testing range, means electrically connected to the vibrator member and including an alternating voltage source for vibrating the vibrator member at a frequency within the high frequency testing range, means including acoustically soft pads mounting the vibrator member so that the vibrator member is vibrated only against inertia, a standard accelerometer mounted on each end plate of the vibrator member, and means on the end plates of the vibrator member for mounting accelerometers under test.

References Cited in the file of this patent

UNITED STATES PATENTS

| | | |
|---|---|---|
| 2,352,219 | Olesen | June 27, 1944 |
| 2,562,917 | Hoyt | Aug. 7, 1951 |
| 2,573,168 | Mason et al. | Oct. 30, 1951 |
| 2,650,991 | Ketchledge | Sept. 1, 1953 |
| 2,661,622 | Severs | Dec. 8, 1953 |
| 2,681,434 | Wheeler | June 15, 1954 |
| 2,715,331 | Yates et al. | Aug. 16, 1955 |